(12) United States Patent
Chang

(10) Patent No.: US 8,339,507 B2
(45) Date of Patent: Dec. 25, 2012

(54) FLASH DEVICE AND IMAGE CAPTURE DEVICE HAVING SAME

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 365 days.

(21) Appl. No.: 12/831,273

(22) Filed: Jul. 7, 2010

(65) Prior Publication Data
US 2011/0169983 A1 Jul. 14, 2011

(30) Foreign Application Priority Data

Jan. 14, 2010 (CN) .......................... 2010 1 0300275

(51) Int. Cl.
*H04N 5/222* (2006.01)

(52) U.S. Cl. ........................................ 348/370; 348/371

(58) Field of Classification Search .......... 348/370–371, 348/373, 375
See application file for complete search history.

(56) References Cited

U.S. PATENT DOCUMENTS

| 7,379,117 | B2 * | 5/2008 | Hwang | 348/371 |
| 7,436,435 | B2 * | 10/2008 | Wada | 348/208.4 |
| 7,733,415 | B2 * | 6/2010 | Kojima | 348/371 |
| 2003/0227559 | A1 * | 12/2003 | Rouvinen et al. | 348/335 |
| 2005/0275749 | A1 * | 12/2005 | Kojima | 348/370 |
| 2006/0012703 | A1 * | 1/2006 | Goami | 348/360 |
| 2009/0128928 | A1 * | 5/2009 | Ito | 359/814 |
| 2009/0284647 | A1 * | 11/2009 | Yanai et al. | 348/371 |

* cited by examiner

*Primary Examiner* — Kelly L Jerabek
(74) *Attorney, Agent, or Firm* — Altis Law Group, Inc.

(57) ABSTRACT

A flash device includes a stationary frame, a light emitting portion, a driving unit and a resilient plate. The light emitting portion is moveably received in the stationary frame and is spaced from the stationary frame. The driving unit includes a first magnetic assembly and a second magnetic assembly. The first magnetic assembly is positioned on the stationary frame. The second magnetic assembly is positioned on the light emitting portion and faces the first magnetic assembly. The driving unit is configured for driving the light emitting portion to move relative to the stationary frame through magnetical interaction between the first magnetic assembly and the second magnetic assembly. The resilient plate interconnects the stationary frame and the light emitting portion. The resilient plate is configured for moving the light emitting portion relative to the stationary frame.

12 Claims, 6 Drawing Sheets

FLASH DEVICE AND IMAGE CAPTURE DEVICE HAVING SAME

BACKGROUND

1. Technical Field

The present disclosure relates to flash devices and image capture devices having such flash devices.

2. Description of Related Art

Image capture devices, such as camcorders and digital cameras, are widely used. The image capture devices often include a flash device to illuminate dark environments. However, the field of illumination of the flash device is nonadjustable, such that the image capture device must be relocated. This is inconvenient.

Therefore, what is needed is a flash device and an image capture device utilizing the same, which can overcome the limitations described.

DETAILED DESCRIPTION

Figure 1:
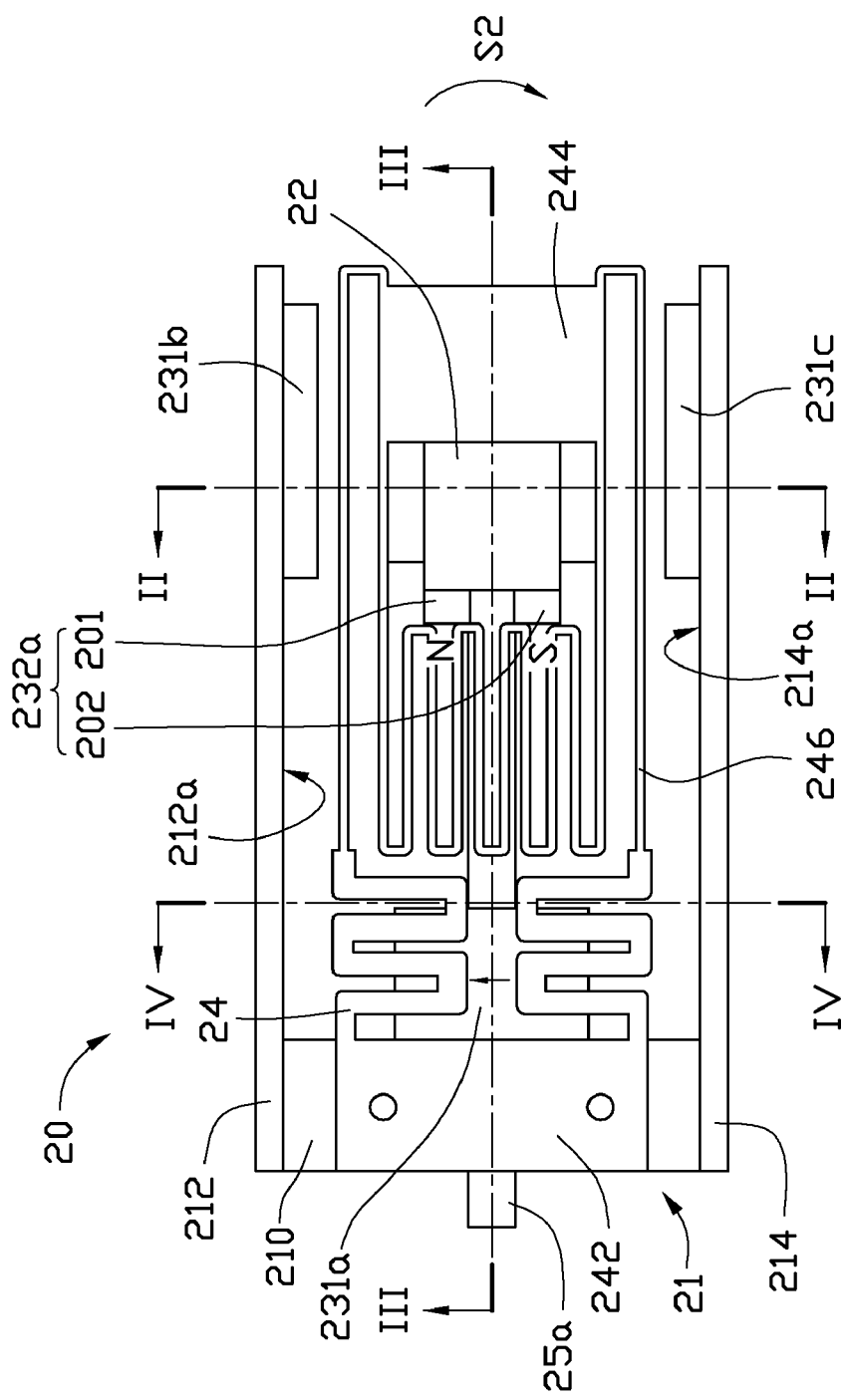
FIG. 1 is a planar view of a flash device, according to a first embodiment.
Figure 2:
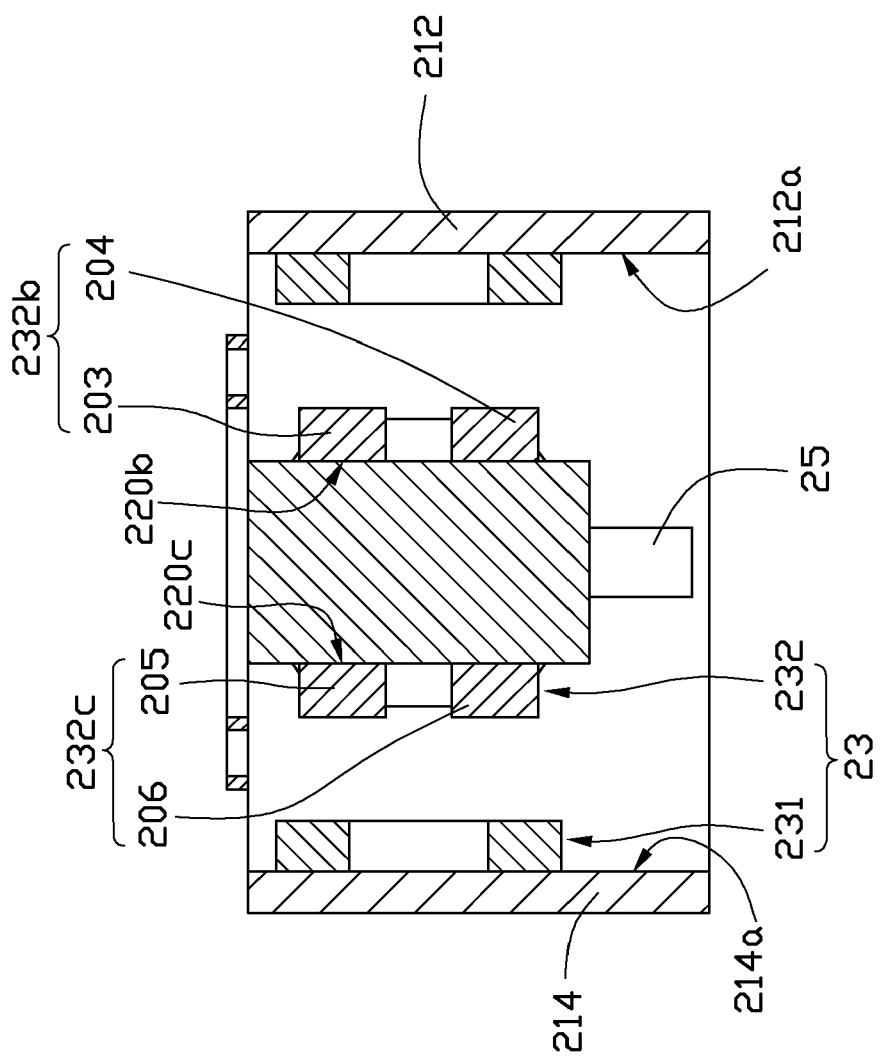
FIG. 2 is a sectional view taken in line II-II of the flash device of FIG. 1.

Referring to FIGS. 1 and 2, a flash device 20, according to a first embodiment, includes a stationary frame 21, a light emitting portion 22, a driving unit 23, a resilient plate 24 and a flexible circuit board 25.

The stationary frame 21 includes a supporting plate 210, a first side plate 212, and a second side plate 214. The first side plate 212 faces the second side plate 214. The first side plate 212 and the second side plate 214 extend from opposite sides of the supporting plate 210. A material of the stationary frame 21 may be plastic or metal.

Figure 3:
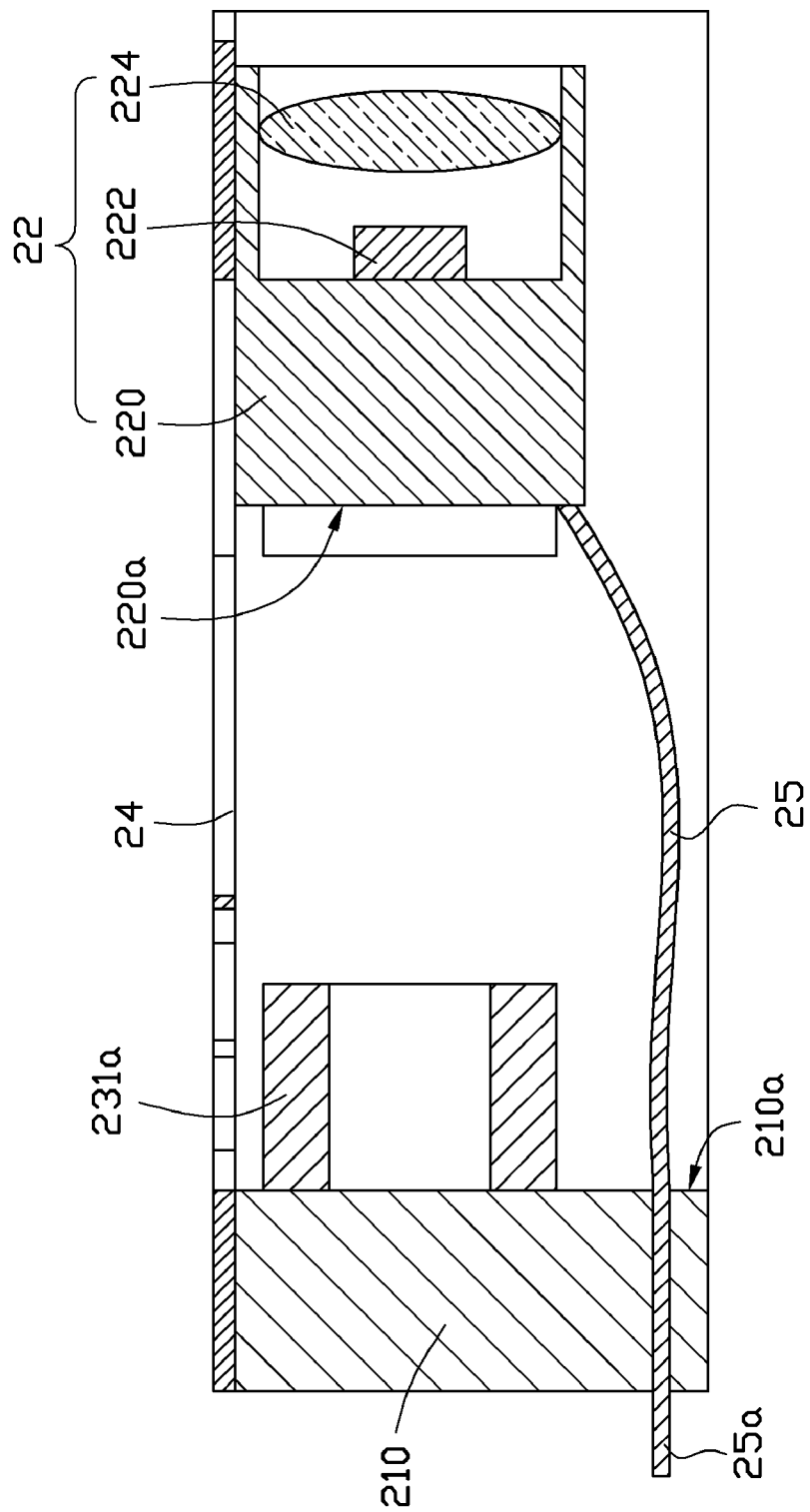
FIG. 3 is a sectional view taken in line of the flash device of FIG. 1.

The supporting plate 210 includes a first inner surface 210a (see FIG. 3). The first side plate 212 includes a second inner surface 212a. The second side plate 214 includes a third inner surface 214a. The first inner surface 210a connects the second inner surface 212a and the third inner surface 214a.

The light emitting portion 22 is moveably received in and spaced from the stationary frame 21. Further referring to FIG. 3, the light emitting portion 22 includes a body 220, a light source 222 and a lens 224. The body 220 receives the light source 222 and the lens 224. The light source 222 is a light emitting diode. The lens 224 is a plastic convex lens or a glass convex lens.

The body 220 of the light emitting portion 22 includes a first side surface 220a, a second side surface 220b, and a third side surface 220c. The first side surface 220a is opposite to the first inner surface 210a of the supporting plate 210. The second side surface 220b is opposite to the second inner surface 212a of the first side plate 212. The third side surface 220c is opposite to the third inner surface 214a of the second side plate 214. The first side surface 220a connects the second side surface 220b and the third side surface 220c. The light emitting portion 22 is configured for emitting light in a direction away from the first side surface 220a.

The driving unit 23 includes a first magnetic assembly 231 and a second magnetic assembly 232. The first magnetic assembly 231 is positioned on the stationary frame 21. The second magnetic assembly 232 is positioned on the light emitting portion 22. The first magnetic assembly 231 faces the second magnetic assembly 232. The driving unit 23 is configured for driving the light emitting portion 22 to move relative to the stationary frame 21 through magnetical interaction between the first magnetic assembly 231 and the second magnetic assembly 232.

Specifically, in this embodiment, the first magnetic assembly 231 includes a first electromagnet 231a, a second electromagnet 231b and a third electromagnet 231c. The electromagnet is a coil. Each of the electromagnets 231a, 231b, 231c is substantially a rectangular-shaped ring. The first electromagnet 231a is fixed to the first inner surface 210a of the supporting plate 210. The second electromagnet 231b is fixed to the second inner surface 212a of the first side plate 212. The third electromagnet 231c is fixed to the third inner surface 214a of the second side plate 214.

The second magnetic assembly 232 includes a first magnet unit 232a, a second magnet unit 232b and a third magnet unit 232c. Each magnet unit is positioned on a corresponding side surface and faces a corresponding electromagnet to interact with the corresponding electromagnet. That is, the first magnet unit 232a is positioned on the first side surface 220a and faces the first electromagnet 231a. The second magnet unit 232b is positioned on the second side surface 220b and faces the second electromagnet 231b. The third magnet unit 232c is positioned on the third side surface 220c and faces the third electromagnet 231c.

Figure 5:
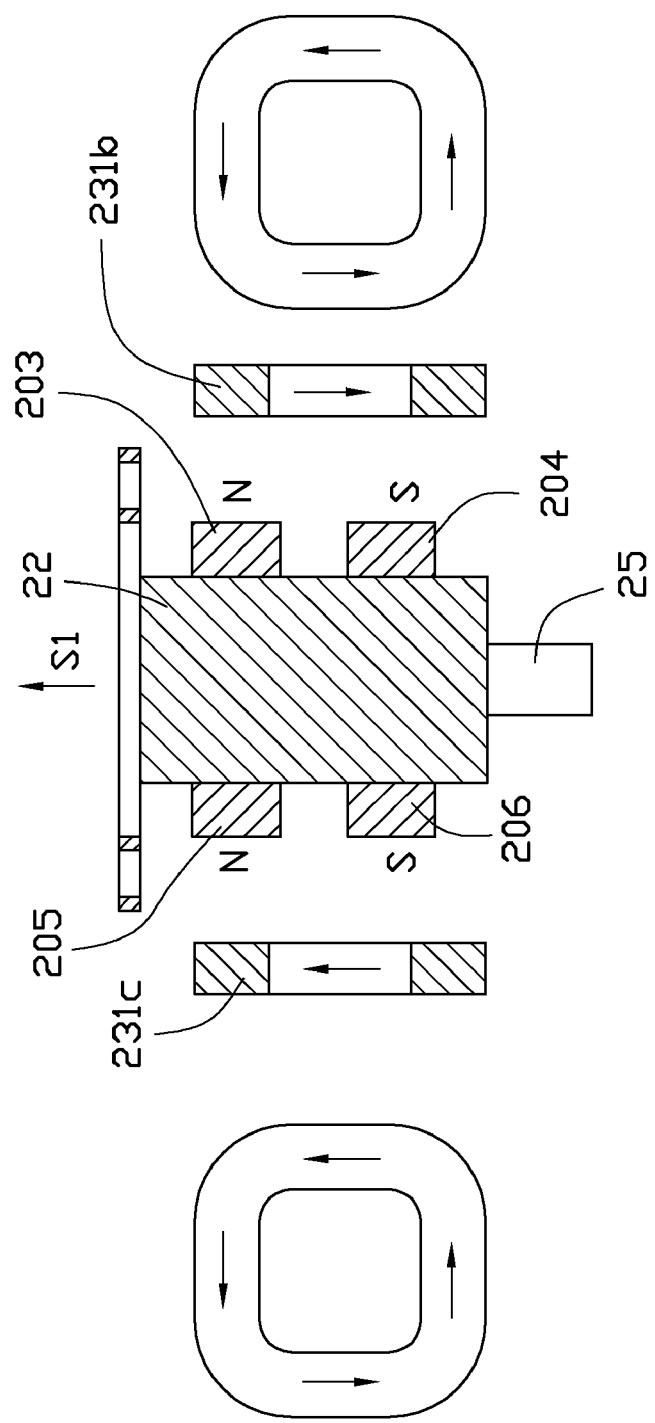
FIG. 5 shows a working principle of the flash device of FIG. 1.

Each magnet unit includes a first magnet and a second magnet. A magnetic pole of the first magnet facing a corresponding electromagnet is opposite to a magnetic pole of the second magnet facing the corresponding electromagnet. For example, the second magnet unit 232b includes a first magnet 203 and a second magnet 204. A first magnetic pole of the first magnet 203 facing the second electromagnet 231b is opposite to a second magnetic pole of the second magnet 204 facing the second electromagnet 231b. In this embodiment, the first magnetic pole is magnetic north, and the second magnetic pole is magnetic south, as shown in FIGS. 1 and 5.

The resilient plate 24 interconnects the stationary frame 21 and the light emitting portion 22 and is configured for moving the light emitting portion 22 relative to the stationary frame 21. The resilient plate 24 includes a mounting end 242, a free end 244 and a resilient connecting portion 246. The resilient connecting portion 246 connects the mounting end 242 and the free end 244. The resilient connecting portion 246 is resiliently deformable with movement of the light emitting portion 22. The mounting end 242 is positioned on top of the supporting plate 210. The free end 244 is positioned on the light emitting portion 22. In this embodiment, the resilient plate 24 is asymmetric to provide uniform restoration.

The flexible circuit board 25 is electrically connected to the light emitting portion 22 and the driving unit 23 and is configured for providing electrical connection between the flash device 20 and peripheral electronic components, such as controlling devices and/or outer power sources. The flexible circuit board 25 extends through the supporting plate 210. A connecting end 25a of the flexible circuit board 25 protrudes from the supporting plate 210. The connecting end 25a may be electrically connected to the outer controlling devices and/or the outer power sources.

Exemplary operations of the flash device 20 are described below.

Referring to FIGS. 2 and 5 (in FIG. 5, the leftmost electromagnet is a planar view of the third electromagnet 231c and the rightmost electromagnet is a planer view of the second electromagnet 231b. It is for easy understanding and description to employ them. The leftmost electromagnet and the rightmost electromagnet in FIG. 5 do not exist actually.), when in use, current applied to the second electromagnet 231b and the third electromagnet 231c using the flexible circuit board 25 is shown as lines with arrows in the electromagnets 231b, 231c in FIG. 5, and the second electromagnet 231b and the third electromagnet 231c generate magnetic fields. Accordingly, an attractive force is applied to the first magnet 203 of the second magnet unit 232b by an upper side of the second electromagnet 231b, and a repellent force is applied to the second magnet 204 of the second magnet unit 232b by a lower side of the second electromagnet 231b. Similarly, an attractive force is applied to a first magnet 205 of the third magnet unit 232c by an upper side of the third electromagnet 231c, and a repellent force is applied to a second magnet 206 of the third magnet unit 232c by a lower side of the third electromagnet 231c. Accordingly, a driving force in a first direction S1 is applied to the light emitting portion 22 and the light emitting portion 22 is driven to move in the first direction S1. The resilient connecting portion 246 is deformed by movement of the light emitting portion 22. When no current is applied to the electromagnets 231b, 231c, the resilient connecting portion 246 is restored to drive the light emitting portion 22 opposite to the first direction S1.

Figure 4:
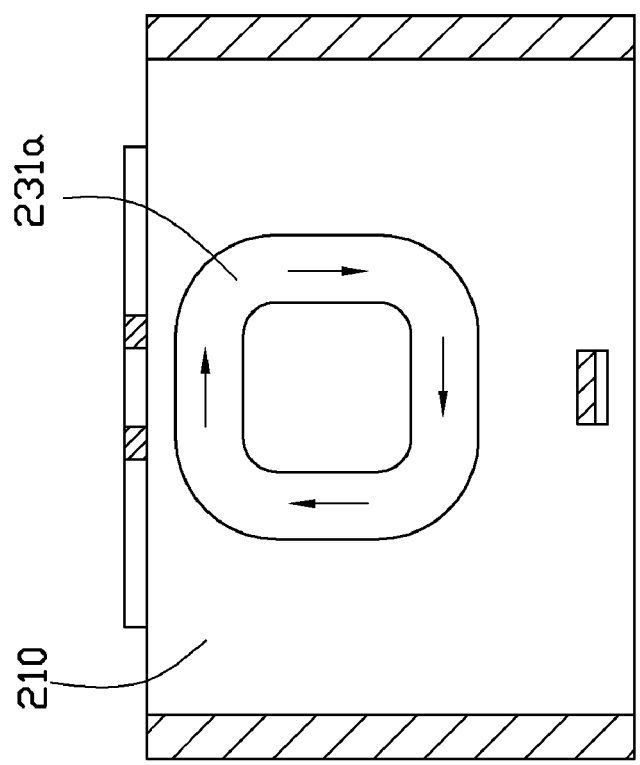
FIG. 4 is a sectional view taken in line IV-IV of the flash device of FIG. 1.

Referring to FIGS. 1 and 4, current applied to the first electromagnet 231a using the flexible circuit board 25 is shown as lines with arrows in the first electromagnet 231a, and first electromagnet 231a generates a magnetic field. Accordingly, a repellent force is applied to a first magnet 201 of the first magnet unit 232a by a right side of the first electromagnet 231a, and an attractive force is applied to a second magnet 202 of the first magnet unit 232a by a left side of the first electromagnet 231a. Therefore, a clockwise torque force in a second direction S2 is applied to the light emitting portion 22 and the light emitting portion 22 is driven to move clockwise in the second direction S2. The resilient connecting portion 246 is deformed by movement of the light emitting portion 22. When no current is supplied to the first electromagnet 231a, the resilient connecting portion 246 is restored to drive the light emitting portion 22 opposite to the second direction S2.

A conveniently adjustable field of illumination of the light emitting portion 22 is thus provided.

It is to be understood that in alternative embodiments, the first magnetic assembly may include magnet units and the second magnetic assembly may include electromagnets.

Figure 6:
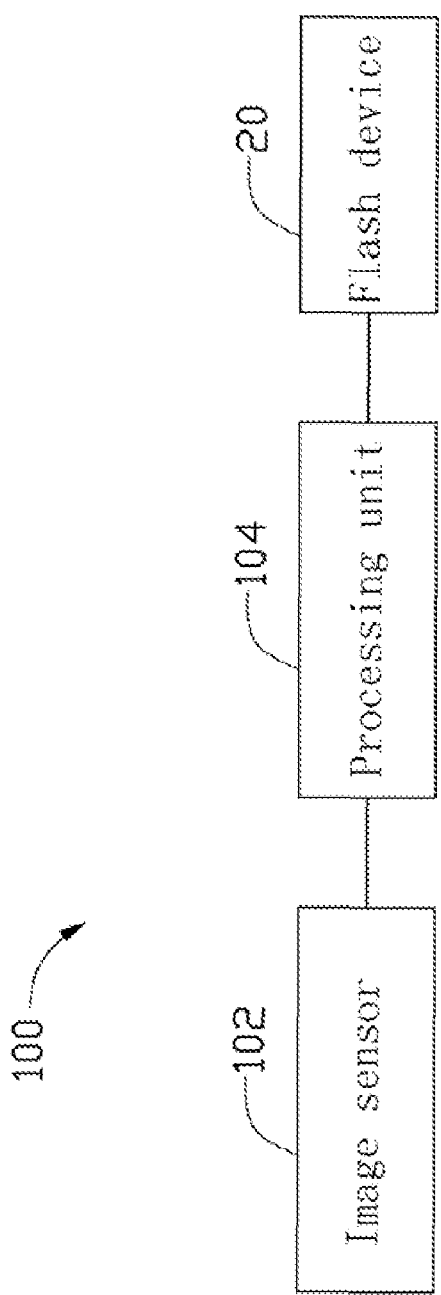
FIG. 6 is a functional block diagram of an image capture device, according to a second embodiment.

Referring to FIG. 6 together with FIGS. 1-5, an image capture device 100, according to a second embodiment, includes a flash device 20, an image sensor 102 and a processing unit 104.

The image sensor 102, such as a charge-coupled device, is configured for capturing a preview image of an object. The processing unit 104 is configured for analyzing a brightness distribution of the preview image to determine a portion of the preview image which requires lightening, and controlling the driving unit 23 to move the light emitting portion 22, thus directing light emitted therefrom toward a region of the object corresponding to the portion of the preview image which requires lightening, and the image sensor 102 captures a final image with a lightened region therein.

Specifically, the processing unit 104 divides the preview image into a plurality of portions and calculates gray scales of the portions to obtain an average. The processing unit 104 determines the portion of the smallest average gray scale to be the portion of the preview image requiring enhanced illumination.

After the portion of the preview image requiring enhanced illumination is determined, the processing unit 104 applies current to the first magnetic assembly 231. Magnetic field(s) generated by the first magnetic assembly 231 interact(s) with corresponding magnet unit(s) to drive the light emitting portion 22 to emit light towards the region corresponding to the portion of the preview image requiring enhanced illumination. Furthermore, before images are captured, the image capture device 100 can perform an auto white balance function, an auto exposure function, and other operations to enhance dynamic ranges of the captured images.

A conveniently adjustable field of illumination of the device flash is thus provided.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A flash device, comprising:
a stationary frame;
a light emitting portion moveably received in the stationary frame and spaced from the stationary frame;
a driving unit comprising a first magnetic assembly and a second magnetic assembly, the first magnetic assembly positioned on the stationary frame, the second magnetic assembly positioned on the light emitting portion and facing the first magnetic assembly, the driving unit configured for driving the light emitting portion to move relative to the stationary frame through magnetical interaction between the first magnetic assembly and the second magnetic assembly; and
a resilient plate interconnecting the stationary frame and the light emitting portion, the resilient plate configured for moving the light emitting portion relative to the stationary frame;
wherein the stationary frame comprises a supporting plate and a first side plate and a second side plate extending from opposite sides thereof and facing each other; and
wherein the first magnetic assembly comprises three electromagnets positioned on the supporting plate, the first side plate and the second side plate respectively.

2. The flash device of claim 1, wherein the light emitting portion comprises a first side surface opposite to the supporting plate, a second side surface opposite to the first side plate, and a third side surface opposite to the second side plate, the first side surface connecting the second side surface and the third side surface, the light emitting portion configured for emitting light in a direction away from the first side surface.

3. The flash device of claim 2, wherein the second magnetic assembly comprises three magnet units positioned on the first side surface, the second side surface and the third side surface respectively, wherein the magnet unit positioned on the first side surface faces the electromagnet positioned on the supporting plate; the magnet unit positioned on the second side surface faces the electromagnet positioned on the first side plate; the magnet unit positioned on the third side surface faces the electromagnet positioned on the second side plate.

4. The flash device of claim 3, wherein each magnet unit comprises a first magnet and a second magnet, the magnetic poles of the first and second magnets facing a corresponding electromagnet are opposite to each other.

5. The flash device of claim 1, wherein the resilient plate comprises a mounting end, a free end and a resilient connecting portion, the mounting end positioned on the supporting plate, the free end positioned on the light emitting portion, and the resilient connecting portion connecting the mounting end and the free end, the resilient connecting portion being resiliently deformable with movement of the light emitting portion.

6. The flash device of claim 1, further comprising a flexible circuit board electrically connected to the light emitting portion and the driving unit, the flexible circuit board configured for providing electrical connections between the flash device and peripheral electronic components.

7. An image capture device, comprising:
a flash device of claim 1;
an image sensor configured for capturing an image of an object; and
a processing unit configured for analyzing a brightness distribution of the image to determine a portion of the image which requires lightening, and controlling the driving unit to drive the light emitting portion to move, thus directing light emitted therefrom toward a region of the object corresponding to the portion of the image which requires lightening;
wherein the stationary frame comprises a supporting plate and a first side plate and a second side plate extending from opposite sides thereof and facing each other; and
wherein the first magnetic assembly comprises three electromagnets positioned on the supporting plate, the first side plate and the second side plate respectively.

8. The image capture device of claim 7, wherein the light emitting portion comprises a first side surface opposite to the supporting plate, a second side surface opposite to the first side plate, and a third side surface opposite to the second side plate, the first side surface connecting the second side surface and the third side surface.

9. The image capture device of claim 8, wherein the second magnetic assembly comprises three magnet units positioned on the first side surface, the second side surface and the third side surface respectively, wherein the magnet unit positioned on the first side surface faces the electromagnet positioned on the supporting plate; the magnet unit positioned on the second side surface faces the electromagnet positioned on the first side plate; and the magnet unit positioned on the third side surface faces the electromagnet positioned on the second side plate.

10. The image capture device of claim 9, wherein each magnet unit comprises a first magnet and a second magnet, and the magnetic poles of the first and second magnets facing a corresponding electromagnet are opposite to each other.

11. The image capture device of claim 7, wherein the resilient plate comprises a mounting end, a free end and a resilient connecting portion, the mounting end positioned on the supporting plate, the free end positioned on the light emitting portion, and the resilient connecting portion connecting the mounting end and the free end, the resilient connecting portion being resiliently deformable with movement of the light emitting portion.

12. The image capture device of claim 7, further comprising a flexible circuit board electrically connected to the light emitting portion and the driving unit, the flexible circuit board configured for providing electrical connections between the flash device and peripheral electronic components.

* * * * *